F. I. BAKER.
PNEUMATIC CUSHION FOR VEHICLES.
APPLICATION FILED NOV. 17, 1911.

1,026,893.

Patented May 21, 1912.

Witnesses

Fred I. Baker,
Inventor by C.A. Snow & Co.,
Attorneys

UNITED STATES PATENT OFFICE.

FRED I. BAKER, OF ORANGE, MASSACHUSETTS.

PNEUMATIC CUSHION FOR VEHICLES.

1,026,893.   Specification of Letters Patent.   Patented May 21, 1912.

Application filed November 17, 1911. Serial No. 660,936.

*To all whom it may concern:*

Be it known that I, FRED I. BAKER, a citizen of the United States, residing at Orange, in the county of Franklin and State of Massachusetts, have invented a new and useful Pneumatic Cushion for Vehicles, of which the following is a specification.

This invention relates to pneumatic cushions particularly designed for use in connection with motor vehicles whereby the effects of jolts or jars on the vehicle body are minimized without the use of pneumatic tires.

A further object is to provide a cushion of this type divided into non-communicating superposed compartments, said compartments being adapted to contain air under different degrees of pressure whereby the efficiency of the structure as a means for absorbing jolts, is increased.

A further object is to provide a cushioning element of this type which is easily accessible at all times for the purpose of inflating it, means being provided whereby the vehicle body is properly guided during its up and down movement relative to the running gear.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
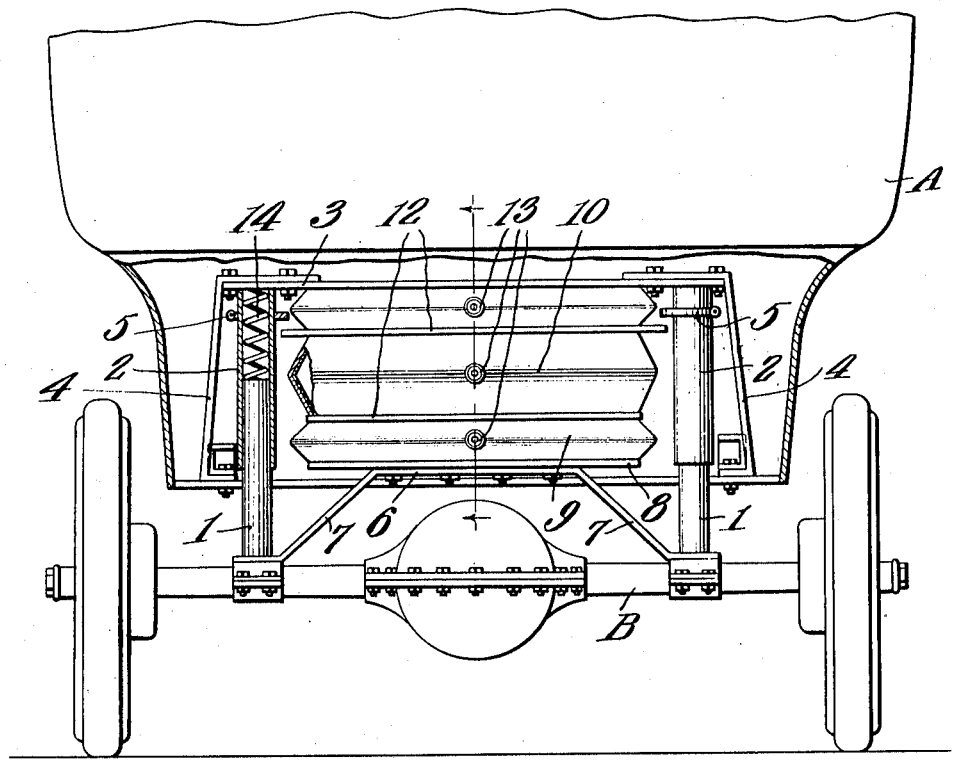
Figure 2:
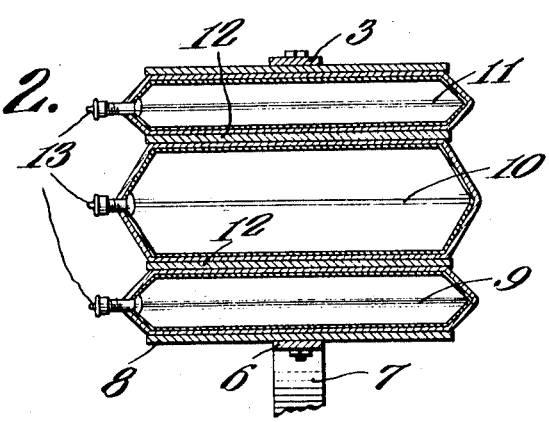

In said drawings:—Figure 1 is a rear elevation of a portion of a motor vehicle having the present improvements combined therewith, parts being shown in section. Fig. 2 is a vertical transverse section through the cushion.

Referring to the figures by characters of reference A designates a portion of the body of a motor vehicle or the like, and B designates one of the axles thereof. Guide stems 1 are fixedly connected to and project upwardly from the axle B and are slidably engaged by tubular members 2 fixedly connected, at their upper ends, to a cross bar 3 which, in turn, is secured in any suitable manner, as by means of brackets 4, to the body A of the vehicle. If desired the body can be so shaped as to extend around the brackets 4 and the tubular members 2 and thus conceal them and the parts adjacent thereto. Furthermore the tubular members 2 can be braced by means of loops 5 extending therearound and attached to the body A.

A base bar 6 is fixedly connected to and supported above the axle B by means of downwardly diverging arms 7 and secured to this base bar is the bottom element 8 of the cushion. The body of the cushion is made up of preferably three superposed collapsible compartments 9, 10 and 11, the walls of which are made up of air tight flexible material. The said compartments are divided from each other by partitions 12 and each compartment is provided with a valved air inlet 13 whereby air can be forced into the compartment by means of an air pump of any preferred type. The top of the upper compartment 11 is secured to the cross bar 3 and, as the bottom of the lower compartment is secured to the base bar 6, it will be apparent that the cushion is thus held against displacement relative to the two bars. The cushion is located between the tubular members 2 and said members are preferably provided with springs 14 located therein and adapted to bear on the upper ends of the guide stems 1. These springs are normally inactive and are only adapted to be placed under compression should one or more of the compartments of the cushion become deflated, and tend to lower the body A to an undesirable extend relative to the axle B. It will be understood that all of the parts of the cushion are preferably housed under the body A so that they cannot be seen under ordinary conditions.

In using the cushion the compartments 9, 10 and 11 are inflated in any preferred manner, the middle compartment 10 being larger than the other two compartments and being adapted to contain air under greater pressure than that within the compartments 9 and 11. It will be seen by providing one of these cushions above each axle of the vehicle, all shocks will be absorbed thereby and it becomes unnecessary to employ pneumatic tires such as commonly used. The upper and lower compartments of the cushions will yield under ordinary strains but, when the body is subjected to excessive jolts, the middle compartment 10 will yield and, should one or more of the compartments become deflated from any cause, the springs 14 will be brought into play to prevent objectionable pounding of the upper ends of the members 2 upon the upper ends of the stems 1.

What is claimed is:—

1. A cushion for vehicles, including superposed non-communicating compartments, said compartments being inflated to different degrees of pressure, means for connecting the upper and lower compartments to a vehicle body and axle respectively, telescopically connected guides adapted to be secured to the body and axle of the vehicle at points remote from the compartments, and compression devices interposed between the guides.

2. The combination with the body of a vehicle and an axle thereunder, of guides upstanding from the axle, additional guides depending from the body and slidably engaging the first mentioned guides, compression devices disposed between said guides, a cross bar connected to the body and between the guides, a base bar secured to the axle and between the guides, and a plurality of constantly exposed non-communicating superposed inflatable elements secured to and interposed between said bars and between the guides and constituting a pneumatic cushion, one of said elements being inflated for greater resistance than the remaining elements.

In testimony that I claim the foregoing as my own, I have hereto affixed my signature in the presence of two witnesses.

FRED I. BAKER.

Witnesses:
 THOMAS B. WILLIAMS,
 M. O. SCHONLER.